3,053,671
NO BAKE COMPOSITIONS FOR MAKING MOLDS AND CORES

August Tobler, Bruneggstrasse 906, Windisch, Switzerland
No Drawing. Filed June 25, 1959, Ser. No. 822,759
2 Claims. (Cl. 106—38.6)

This invention relates to a composition for the manufacture of molds and cores in foundries and particularly to a composition which does not require the baking step heretofore common in the foundry industry. There has long been a need for a composition which could be used in the making of foundry molds and cores without the need for an intermediate baking step. This problem has long been known in the foundry art and there have been some compositions proposed for this purpose. These compositions have, however, achieved only limited success, primarily because of their damaging or undesirable side effects. All of the compositions which have heretofore been proposed have provided insufficient collapsibility, insufficient flowability, poor workability, bad odors or health hazards which have limited their usefulness.

The present invention provides a composition which has satisfactory collapsibility and workability and is free from objectionable odors and health hazards. The composition may be used with conventional foundry mold and core making materials such as sand, clay-containing minerals or clays. The composition permits the making of high production cores and molds. These cores and molds have high green strength and can be drawn immediately and their gas and odor evolution is low.

I have found that a combination of esters of abietic acids, particularly abietic esters of polyvalent alcohols together with one or more drying oils will provide a composition which when mixed with foundry sand or similar mineral core and mold making materials provides a core or mold which may be used without the conventional baking step. Preferably the composition contains from about 15% to about 35% of one or more esters of abietic acids and the balance one or more conventional drying oils and conventional mineral dryers such as lead, zircon etc.

The invention may perhaps be best understood by reference to the following examples:

Example I

A mold and core binder was made by mixing 25% of abietic pentaester and 75% oiticica oil. This mixture was polymerized at 200° C. to a viscosity of 3000 centipoises. Three tenths percent of lead naphthenate and 0.1% cobalt naphthenate were added as dryers and cores were made by mixing 2% of this composition with 98% of Ottawa silica sand. The material was formed into cores and immediately thereafter removed from the core boxes. The resulting cores had sufficient green strength to support themselves and were used without baking to produce satisfactory castings.

Example II

Twenty percent abietic glycerine ester was mixed with 80% tung oil and the mixture was polymerized at 200° C. to a viscosity of 3000 centipoises. Metallic dryers were added and cores were made in a manner similar to that set out in Example I. The green strength of the cores was satisfactory to support them and castings were satisfactorily made without baking.

Example III

Eighteen percent of abietic maleic pentaester was mixed with 82% dehydrated caster oil. The composition was polymerized at 260° C. to a viscosity of 4000 centipoises. Metallic dryers were added and the composition was admixed with foundry sand as in Example I. Sand cores and castings were made without baking.

Example IV

Twenty-three percent of abietic phthallic glycerine ester was mixed with 77% of blown linseed oil having a viscosity of 2000 centipoises. This mixture was polymerized at 200° C. to a viscosity of 3000 centipoises. Metallic dryers were added and satisfactory cores were made.

Satisfactory cores and molds may be made by incorporating clays into the foundry sands.

Example V

The composition of Example I was admixed in the amount of 2% with 2% bentonite and 96% of silica sand. Cores were made and found to have high green strength and the ability to set up early. Satisfactory castings were made without baking the resulting cores.

It is characteristic of the cores and molds made with the compositions of this invention that they need no ramming. They have high green strength, early setting properties and need no oven baking. I have found that the binder composition of this invention should be added to the mineral aggregate forming the core in an amount between about 1% to 5% on the sand or aggregate. Preferably, I use a conjugated double bond oil as the drying oil with the abietic ester. The curing time may be varied and controlled by the addition of oxygen carriers such as sodium perborate and by alkalis. I have also found that as the clay content of the sand or aggregate used in the core or mold increases, the amount of binder must be increased up to a maximum of about 5%. The effect of the clay or clay-containing minerals on curing time is insignificant and flowability remains excellent. In all cases the cores have ben found to have excellent collapsibility.

While I have described certain preferred practices and compositions according to my invention, it will be understood that the invention may be otherwise embodied within the scope of the following claims.

I claim:
1. A composition for foundry cores and molds consisting essentially of a foundry sand aggregate admixed with a binder consisting essentially of about 15% to 35% of a polyhydric alcohol ester of abietic acid admixed with about 65% to 85% of a drying oil.
2. A composition for foundry cores and molds consisting essentially of a foundry sand aggregate admixed with a binder consisting essentially of about 15% to 35% of a polyhydric alcohol ester of abietic acid, about 0.1 to 1% of a metallic dryer and sufficient drying oil to make 100% of the binder.

References Cited in the file of this patent

UNITED STATES PATENTS

| | | |
|---|---|---|
| 2,270,947 | Hough | Jan. 27, 1942 |
| 2,324,432 | Schantz | July 13, 1943 |
| 2,383,624 | Spiller | Aug. 28, 1945 |
| 2,434,168 | Krumbhaar | Jan. 6, 1948 |
| 2,584,300 | Simmers | Feb. 5, 1952 |
| 2,749,247 | Aggarwal et al. | June 5, 1956 |
| 2,816,041 | Moser | Dec. 10, 1957 |